April 26, 1966     H. CHELNER     3,247,719

STRAIN DECOUPLED TRANSDUCER

Filed Oct. 1, 1963

INVENTOR.
HERBERT CHELNER

BY

*Donald W. Draves*

ATTORNEY

United States Patent Office  3,247,719
Patented Apr. 26, 1966

3,247,719
STRAIN DECOUPLED TRANSDUCER
Herbert Chelner, 7456 Vanalden Ave., Reseda, Calif.
Filed Oct. 1, 1963, Ser. No. 312,952
4 Claims. (Cl. 73—420)

This invention relates to pressure transducers.

More particularly, this invention relates to a mounting for pressure transducer elements.

There are many applications for pressure transducers. In some applications, it is desirable to have an extremely small pressure transducer mounted in devices such as inducer blades of liquid pumps so that the pressure against the blade can be determined. In such a case, the transducer element is mounted so that pressure is transmitted to a diaphragm which forms a part of the transducer and which is mounted flush with the wall of the inducer blade. There are examples in the prior art of pressure transducers utilizing a diaphragm having mounted thereon strain gage elements in the form of a Wheatstone bridge so that as the diaphragm is flexed due to pressure thereon, the flexure will transfer stress to the strain gage elements which then exhibit a change in resistance due to the strain. This change in resistance can be measured by a voltage readout in a Wheatstone bridge circuit and this voltage change translated to a pressure reading. When these pressure transducers are used with cryogenic fluids or other extreme temperatures, it is necessary that the pressure transducer be temperature compensated over various ranges of temperature. Also, when these transducer elements are mounted in inducer blades, it is necessary that the mounting structure be such that strains induced by mounting are not transferred to the strain gage elements since an inaccurate reading will result. It is to solving the problem of mounting transducer elements to which this invention is directed.

Basically, this invention is directed to a transducer having a case with transducer elements associated therewith and flange means extending from the case for mounting the case on a supporting structure. The flange means has formed therein an annular groove to preclude excessive strains being transferred from the mounting structure to the case. At the point of juncture of the diaphragm and the casing structure there is a cutaway portion to further prevent transfer of stresses.

An object of this invention is to provide an improved transducer.

Other objects and advantages of this invention will become apparent as this description proceeds taken in conjunction with the drawings in which.

Figure 1:
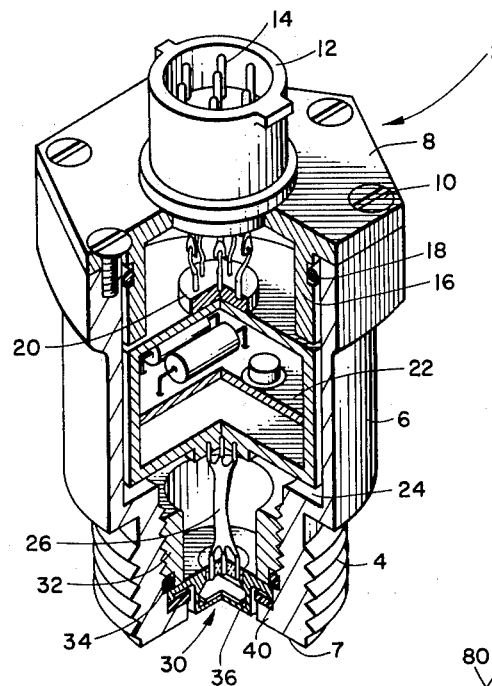
FIG. 1 is a perspective view partially in cross-section of a transducer package.

Referring to FIG. 1, there is shown a pressure transducer package indicated generally at 2. This package by means of screw threads 4 is screwed into the wall of an inducer blade or other device so that surface 7 of housing 6 is flush with the surface against which pressure is exerted and which it is desired to measure. Housing 6 is secured to end retaining assembly 8 by means of screws 10. The electrical connector is designated generally at 12 and includes prong 14 for electrical connection to the power source and recording equipment. Sealing between leg 16 of retaining assembly 8 and housing 6 is accomplished by an O ring 18. Designated generally at 20 are the electrical leads leading to the electronic package 22. This electronic package is conventional and forms no part of this invention. However, this electronic package may include a circuit similar to that described in FIG. 2 of a co-pending application Serial No. 313,276 filed on October 2, 1963 and assigned to the assignee of this invention. The electronic package is retained between wall 16 of retaining assembly 8 and surface 24 of housing 6. Connecting cable 26 is shown which connects to transducer assembly 30 which is described in more detail in FIG. 2. Transducer assembly 30 is mounted between cylinder 32 and lower portion 40 of housing 6. Cylinder 32 is screw-threaded within housing 6 and sealing is accomplished by means of O ring 34. Surface 36 of transducer assembly 30 is flush with surface 7 and the pressurized surface of the inducer blade.

Figure 2:
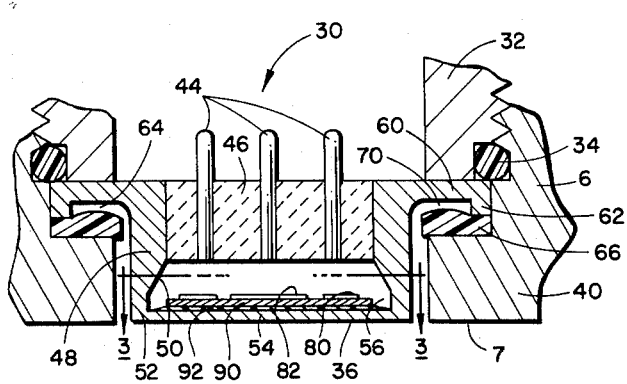
FIG. 2 is a cross-sectional view of the transducer element mounting structure according to this invention.

Referring to FIG. 2 there is shown a transducer assembly which, as stated previously, is mounted within the transducer package for insertion in the wall of a turbine blade. Thus, transducer assembly 30 is mounted between cylinder 32 and leg 40 of housing structure 6. During assembly, cylinder 32 is screwed down toward leg 40 thus retaining transducer assembly 30 between the two members. Transducer assembly 30 is about one-eighth of an inch in depth and about one-quarter of an inch in diameter.

Transducer assembly 30 includes electrical leads 44 which connect to the electronics package through connecting cable 26. These electrical leads are mounted in glass block 46 which is held in place between walls 48 of the transducer assembly by cementing. Wall 48 tapers at 50 to a narrower wall portion 52 on which a machined flat diaphragm 54 is integrally attached. This forms a cutaway portion 56 for a purpose to be described later. Shown at 80 and 82 are semi-conductor strain gage elements which are mounted on the flat diaphragm through wafer 90 and bonding agent 92. When pressure is caused to bear against surface 36 of diaphragm 54, the diaphragm will flex and since strain gage elements 80 and 82 are movable therewith, will cause a change in the dimension of the strain gage elements. When these elements are connected in the conventional Wheatstone bridge circuit, their change of resistance with strain characteristics can be utilized to cause a change in the voltage readout which, in turn, is translated into a pressure reading. The electronic portion of this semi-conductor strain gage assembly forms no part of this invention and is conventional.

Figure 3:
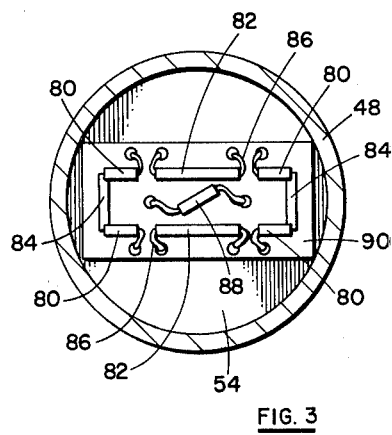
FIG. 3 is a view of the transducer elements as they are mounted on the diaphragm and is taken along the line 3—3 of FIG. 2.

In FIG. 3, the arrangement of strain gage elements on the diaphragm is shown. When the diaphragm is flexed inwardly, the peripheral area of the diaphragm on the inside of the transducer assembly is in slight compression while the center of the diaphragm is in tension. Accordingly, each of the gages 80 are in compression when the diaphragm is flexed inwardly while gages 82 are in tension. Since small size is desirable, gages 80 are half the length of gages 82 and connected by metal leads 84 on each side to act as a single gage. Thus, gages 80 on the left of gages 82 when viewing FIG. 3 act as one gage in compression and gages 80 to the right of FIG. 3 act as one gage, likewise in compression. Both gages 82 are in tension. Leads 86 are appropriately provided to connect the gages in the Wheatstone bridge configuration. Shown at 88 in an approximate 45° position is a temperature sensitive gage which can be used to make vernier corrections to the pressure data as well as to provide a temperature measurement from the same transducer. This element would accordingly be strain insensitive. Leads 86 are connected to leads 44 but for simplicity is not shown in FIG. 2.

To facilitate assembly of the strain gage elements on the diaphragm, a silicon n-doped wafer 90 is provided upon which p-doped semiconductor strain gages 80, 82 and 88 are planarly diffused. The wafer and the gages is then secured to diaphragm 54 by means of a bonding compound 92.

Shown at 60 is a flange for mounting the casing structure between elements 32 and wall portion 40. This flange includes a thickened portion 62 which results in a groove being formed at 64 circumferentially of the transducer assembly. A copper gasket 66 is shown although the material used is not critical. This gasket preferably does not take up the total space between the transducer assembly and the securing structure. The gasket is accordingly chosen so as to leave a void 70.

The advantage in the structure so far described by the use of or the formation of cutaway portion 56 and groove 64 resides in reducing the strain induced in the strain gage elements and the diaphragm when the structure is mounted. For example, when the semi-conductor transducer package is mounted in the blade wall, stresses may develop which are transferred through housing 6 to the transducer assembly 30. In turn, the strains may be transmitted to the flexible diaphragm wall 54 of assembly 30 and hence to the gage elements 80 and 82. By providing groove 64 and cutaway portion 56, these stresses are minimized. Furthermore, by the use of glass seal 46, any inwardly directed radial compressive stresses through flange 60 will be transferred to the glass block 46. Also, this groove tends to de-couple strains induced by the difference in the temperature coefficient of expansion of the associated metals in addition to those caused by initial strains due to mounting. This is particularly important, for example, when the pressure on the inducer blade is caused by cryogenic fluids. In addition to de-coupling strains, the use of groove 64 provides a void for the movement of gasket 62. Accordingly, when the element is assembled, the gasket which may be copper is "squeezed" into the groove which will accommodate this expansion. Finally, this groove is formed by the integral housing assembly. In addition, cutaway portion 56 tends to reduce the transfer of any stresses induced in wall 48 to diaphragm 36.

It can be seen, therefore, that by the selection of the groove in a mounting flange and by providing a cutaway portion in the wall of the housing structure near the diaphragm periphery and by the stiffening action of the glass wall, stresses induced by temperature changes, mounting and other factors are not allowed to be transferred to the diaphragm, thus rendering the readings of the strain gage elements mounted on the diaphragm to be those induced solely by pressures on the face of the diaphragm.

It is to be understood that the form of the invention herein shown and described is to be taken as a preferred embodiment of the same and that the various changes in the shapes, size and arrangement of parts may be resorted to without departing from the spirit of the invention or the scope of the claims appended hereto.

I claim:
1. A transducer and mounting structure therefor comprising; a case, said case including an annular upstanding wall, a diaphragm member at one end of said case, said diaphragm member having mounted thereon strain gage elements, a closure member at the other end of said case, a radially outwardly directed flange extending from said upstanding wall adjacent said other end, said flange having a peripheral annular wall of a height greater than the thickness of said flange spaced from said upstanding side wall whereby to form an annular groove, and means in cooperation with said flange to mount said transducer to a supporting structure.

2. A transducer comprising: an annular upstanding wall, a diaphragm at one end of said wall, said diaphragm having mounted thereon strain gage elements, said wall being indented to form peripheral portions of less thickness adjacent said diaphragm whereby to prevent transfer of strain to said diaphragm, a closure member at the other end of said wall, a radially outwardly extending flange extending from said wall, said flange having a peripheral annular wall forming with said flange and said upstanding wall a groove for strain relief, and means including a portion of said flange to mount said transducer in sealing relationhip to adjacent structure.

3. A transducer and mounting structure therefor comprising; a case, said case including an annular upstanding wall, a diaphragm member at one end of said case, said diaphragm member having mounted thereon strain gage elements, a closure member at the other end of said case, a radially outward directed flange extending from said upstanding wall adjacent said other end, said flange having a peripheral annular wall of a height greater than the thickness of said flange spaced from said upstanding side wall whereby to form an annular groove, a first mounting member engaging one side of said flange, a gasket engaging the annular wall of said flange on the other side of said flange, and a second mounting means engaging said gasket.

4. A transducer and mounting structure according to claim 3 wherein said upstanding side wall tapers toward said diaphragm member to form a thinner wall portion adjacent the peripheral edge of said diaphragm member.

References Cited by the Examiner

UNITED STATES PATENTS 2,629,801  2/1953  Warshaw _____ 73—398 X

FOREIGN PATENTS 549,881  12/1942  Great Britain.

RICHARD C. QUEISSER, *Primary Examiner.*

CHARLES A. RUEHL, *Assistant Examiner.*